United States Patent [19]
Kawasaki et al.

[11] Patent Number: 6,132,826
[45] Date of Patent: Oct. 17, 2000

[54] METHOD OF MANUFACTURING HOLLOW BLADE AND HOLLOW BLADE MANUFACTURED BY SAME

[75] Inventors: Hiraku Kawasaki; Takeo Simomura, both of Osaka, Japan

[73] Assignee: Daikin Industries, Ltd., Osaka, Japan

[21] Appl. No.: 09/029,612

[22] PCT Filed: Oct. 9, 1997

[86] PCT No.: PCT/JP97/03661

§ 371 Date: Mar. 11, 1998

§ 102(e) Date: Mar. 11, 1998

[87] PCT Pub. No.: WO98/16746

PCT Pub. Date: Apr. 23, 1998

[30] Foreign Application Priority Data

Oct. 14, 1996 [JP] Japan ................................. 8-270901

[51] Int. Cl.[7] ............................ B29C 45/16; B32B 31/20
[52] U.S. Cl. ........................ 428/35.7; 428/58; 428/192; 264/513; 264/171.26; 264/172.1; 264/328.1; 156/73.1; 416/223 R; 416/232; 416/241 A
[58] Field of Search ................................... 428/35.7, 34.1, 428/36.9, 36.92, 57, 58, 192; 264/513, 171.26, 328.1, 172.1; 156/73.1, 580.1, 580.2; 416/223 R, 229 R, 232, 233, 241 R, 241 A

[56] References Cited

U.S. PATENT DOCUMENTS

| | | | |
|---|---|---|---|
| 3,936,920 | 2/1976 | Conn, Jr. ......................... | 29/889.72 |
| 4,669,164 | 6/1987 | Phelps ............................. | 29/889.4 |
| 4,720,244 | 1/1988 | Kluppel et al. ................... | 416/224 |
| 5,091,029 | 2/1992 | Davis et al. ...................... | 156/174 |
| 5,213,476 | 5/1993 | Monroe ........................... | 416/230 |
| 5,683,636 | 11/1997 | Van Der Spek et al. .......... | 264/45.7 |
| 5,876,183 | 3/1999 | Furlan et al. .................... | 416/213 R |

FOREIGN PATENT DOCUMENTS

| | | |
|---|---|---|
| 60-018243 | 1/1985 | Japan . |
| 05305376 | 11/1993 | Japan . |

*Primary Examiner*—Rena L. Dye
*Attorney, Agent, or Firm*—Nixon Peabody LLP; Donald R. Studebaker

[57] ABSTRACT

In injection-molding first and second blade bodies (2, 3), convex parts (23, 32) are formed on the surfaces of the first and second blade bodies (2, 3), respectively. Then, a horn (16) of an ultrasonic welding device is placed at a position of crossing both the convex parts (23, 32) to come into contact with the top surfaces of the convex parts (23, 32) while pressing them at the same time, and in this state, the ultrasonic welding device is operated. Contact surfaces of the first and second blade bodies (2, 3) are welded at their portions corresponding to a pressing direction of the horn (16) and concurrently, both the convex parts (23, 32) are deformed by melting under pressure through the horn (16) to trickle melting resin of both the convex parts (23, 32) into a clearance (10) between the first and second blade bodies (2, 3), so that both the blade bodies (2, 3) are joined to each other.

3 Claims, 6 Drawing Sheets

METHOD OF MANUFACTURING HOLLOW BLADE AND HOLLOW BLADE MANUFACTURED BY SAME

TECHNICAL FIELD

This invention relates to a method of manufacturing a hollow blade and a hollow blade manufactured by the method.

BACKGROUND ART

FIG. 7 shows one of procedures in a conventionally typically method of manufacturing a hollow blade. FIGS. 8 and 9 each show an essential part of a hollow blade 50 manufactured by the conventional method.

In the conventional method of manufacturing a hollow blade, a first blade body 51 with a recessed part 53 and a second blade body 52 formed so as to close the recessed part 53 are first put together. Then, the first and second blade bodies 51, 52 are joined by welding by means of a ultrasonic welding device thereby forming the hollow blade 50 internally provided with a hollow part 56 composed of a part of the recessed part 53.

In this case, the first blade body 51 is provided with a shelf surface 54 formed at an outer periphery of the recessed part 53. An outer peripheral part of the back face 52b of the second blade body 52 is laid on the shelf surface 54 of the first blade body 51 so that the second blade body 52 is faced with the first blade body 51 in a partly contact state. An outer peripheral end surface 51b between the shelf surface 54 and the surface 51a of the first blade body 51 is opposed to an outer peripheral end surface 52c of the second blade body 52 with a set space left, thereby creating a clearance 59 between both the outer peripheral end surfaces 51b, 52c.

In the state that the first and second blade bodies 51, 52 are faced with each other in a contact state, a horn 60 of the ultrasonic welding device is moved down from above the clearance 59. Thus, the end surface 60a of the horn 60 is located at a position of crossing the first and second blade bodies 51, 52 interposing the clearance 59 therebetween and comes into contact with both the blade bodies 51, 52 while pressing them. In this state, ultrasonic vibrations are applied to the blade bodies 51, 52 by the horn 60 in its pressing direction (direction of arrows a–b of FIG. 7).

Frictional heat resulting from the ultrasonic vibrations is produced between the shelf surface 54 of the first blade body 51 and the outer peripheral part of the back face 52b of the second blade body 52 which come into face-to-face contact with each other, and is also produced between each of the surfaces 51a, 52a of the first and second blade bodies 51, 52 and the end surface 60a of the horn 60 which come into face-to-face contact with each other.

If frictional heat produced due to contact between resin materials is compared with frictional heat produced due to contact between metal and resin, the former has a higher temperature. Accordingly, resin is more readily melted at a part where the back face 52b of the second blade body 52 is laid on the shelf surface 54 of the first blade body 51, so that a resin melting part 55 shown in FIG. 8 or a first resin melting part 55A shown in FIG. 9 is produced. The first and second blade bodies 51, 52 are joined to each other through the resin melting part 55 or the first resin melting part 55A.

On the other hand, on each of the surfaces 51a, 52a of the first and second blade bodies 51, 52, resin is softened through the application of pressure and ultrasonic vibrations by the horn 60 so that a circular impression 58 along the shape of the horn 60 is produced. As shown in FIG. 8, when the pressing force of the horn 60 is set smaller so as to reduce the depth of the impression 58 as small as possible, an amount of melting resin produced by the formation of the impression 58 is decreased. As a result, an amount of flow of the melting resin into the clearance 59 is also decreased so that the clearance 59 is substantially kept in its original state.

On the contrary, when the pressing force of the horn 60 is increased, the depth of the impression 58 becomes larger as shown in FIG. 9, so that the amount of meltingresin produced accompanying the formation of the impression 58 is increased. As a result, a part of the melting resin flows into the clearance 59 so that a second resin melting part 55B is formed at an upper portion of the clearance 59. The second resin melting part 55B joins the first and second blade bodies 51, 52 to each other.

The joint strength between the first and second blade bodies 51, 52 is mainly ensured by the resin melting part 55 (in the case of FIG. 8) or the first resin melting part 55A (in the case of FIG. 9). However, when both the blade bodies 51, 52 are also joined to each other through the second resin melting part 55B as shown in FIG. 9, the joint strength between both the blade bodies 51, 52 is increased, which is preferable in point of joint strength.

Problems to be Solved

Since the joint strength between the first and second blade bodies 51, 52 is mainly ensured by the resin melting part 55 (in the case of FIG. 8) or the first resin melting part 55A (in the case of FIG. 9) as mentioned above, the resin melting parts 55, 55A must be surely formed in order to ensure reliability on the manufacture of the hollow blade 50. In other words, it is necessary to check, in a quality inspection after the manufacture, that the parts in question have been subjected to welding by the ultrasonic welding device.

In this case, a particular need for mass production of the hollow blade 50 is that the quality inspection can be made with efficiency and reliability.

However, since the resin melting parts 55, 55A are located inside the hollow blade 50, the inspector cannot make a direct visual check of them from outside. Therefore, in order to perform the quality inspection of the hollow blade 50 with efficiency and reliability, it is necessary that a visual check of the resin melting parts 55, 55A can be made by the inspector even though it is in an indirect manner.

In the case of the hollow blade 50 manufactured by the conventional manufacturing method, the impression 58 can be an object of the visual check.

Next, a consideration will be given to the hollow blade 50 manufactured by the conventional manufacturing method shown in FIGS. 8 and 9.

In the hollow blade 50 shown in FIG. 8, the depth of the impression 58 produced on the surfaces 51a, 52a of the first and second blade bodies 51, 52 is reduced as small as possible. Accordingly, when the quality inspection is performed through a visual check of the impression 58, it is difficult to recognize the impression 58 and, in some cases, it may be difficult to judge whether a welding work has been made or not. Accordingly, the above-mentioned hollow blade 50 has a problem in point of efficiency and reliability of the quality inspection.

In the hollow blade 50 shown in FIG. 9, since the depth of the impression 58 is large, a visual check of the impression 58 can be made with ease and reliability, which makes the hollow blade 50 of this case seem preferable in point of efficiency and reliability of the quality inspection. Further, since the second resin melting part 55B is formed at the upper portion of the clearance 59, the hollow blade 50 of this case has an advantage in its increased joint strength.

However, when an impeller is formed of the hollow blades 50 with such an impression 58 having a large depth, it can be considered that large noise is produced at the position of the impression 58 in association with the rotation of the impeller, which is not preferable.

In addition, the formation of such an impression 58 having a large depth squeezes a part of melting resin out of the impression 58 in a radial direction, thereby forming a swelling 57 around the impression 58. Since the swelling 57 results in production of noise if it is left, it is required to be removed. This increases the number of manufacturing steps, which is an undesired effect.

The present invention has been made in view of the foregoing problems and therefore, has its object of providing a hollow blade on which an inspection for a joint work can be performed with efficiency and reliability through a visual check from outside while the smoothness of the blade surface is maintained and providing a method of manufacturing the hollow blade.

DISCLOSURE OF INVENTION

To solve the above problems, the present invention takes the following measures.

A first invention premises a method of manufacturing a hollow blade whereby first and second resin-made blade bodies formed by injection molding are put together and are joined by welding by means of an ultrasonic welding device to form a hollow blade internally provided with a hollow part.

First, in injection-molding the first and second blade bodies, respective convex parts swelling from respective surfaces of the first and second blade bodies are formed at positions contiguous with and opposed to each other when both the blade bodies are put together.

Next, in joining the first and second blade bodies to each other by the ultrasonic welding device, a horn of the ultrasonic welding device is placed at a position of crossing both the convex parts to come into contact with the top surfaces of the convex parts while pressing them at the same time and in this state the ultrasonic welding device is operated.

Then, contact surfaces of the first and second blade bodies which extend in a direction approximately orthogonal to a direction of putting together both the blade bodies are welded at their portions corresponding to a pressing direction of the horn, and concurrently, both the convex parts are deformed by melting under pressure through the horn to trickle melting resin of both the convex parts into a clearance between the first and second blade bodies so that both the blade bodies are welded in a manner of forming a bridge therebetween, thereby joining both the blade bodies into one piece to form a hollow blade.

A second invention is so composed that in the first invention, an amount of deformation of each of the convex parts through the application of pressure by the horn is set at a value approximately identical to the height of the convex part.

A third invention premises a hollow blade in which first and second blade bodies are put together to form a hollow part therebetween.

The first and second blade bodies in a state of being put together are joined by welding at their contact parts and their opposed parts forming a clearance created when the first and second blade bodies are put together.

A fourth invention is so composed that in the third invention, a welded part at the clearance between the first and second blade bodies is formed such that the surface thereof is approximately flush with the surfaces of the first and second blade bodies.

Effects of the Invention According

According to the first to fourth inventions above-mentioned, the following effects can be obtained.

According to the first invention, respective convex parts are provided on respective surfaces of the first and second blade bodies in injection-molding both the blade bodies, the first and second blade bodies are welded at their contact parts, and melting resin of both the convex parts are concurrently trickled into a clearance between the first and second blade bodies so that both the blade bodies are welded. Accordingly, a joint work can be verified by a visual check of the deformation of the convex parts.

In detail, in joining the first and second blade bodies to each other by the ultrasonic welding device, convex parts previously provided on the first and second blade bodies are deformed under pressure. Accordingly, after the hollow blade is manufactured, a visual check is made on the state of deformation of the convex parts as compared with the state of the convex parts before manufacturing the hollow blade, thereby verifying that a joint work by means of the ultrasonic welding device has been performed.

In other words, a resin melting part is surely formed on the contact surfaces of the first and second blade bodies inside the hollow blade, and the joint of both the blade bodies through the resin melting part can be verified with ease and reliability. As a result, a post-manufacturing quality inspection of the hollow blade can secure efficiency and reliability.

Further, the convex parts are melted and the melting resin thereof is trickled into the clearance between the first and second blade bodies by the horn, so that a resin melting part is formed in the shape of a bridge between both the blade bodies. Thereby, the first and second blade bodies are also joined at an upper portion of the clearance through the resin melting part, which further increases joint strength.

According to the second invention, since an amount of deformation of each of the convex parts through the application of pressure by the horn is set at a value approximately identical to the height of the convex part, the blade surface has no unevenness when the convex parts are deformed under pressure, which maintains the excellent smoothness of the blade surface.

According to the third invention, since the first and second blade bodies in a state of being put together are joined by welding at their contact parts and their opposed parts forming a clearance created when the first and second blade bodies are put together, the joint strength between both the blade bodies is higher as compared with the case that both the blade bodies are joined by welding only at their contact parts, which increases the reliability in using the blade.

According to the fourth invention, since a welded part at the clearance between the first and second blade bodies is formed such that the surface thereof is approximately flush with the surfaces of the first and second blade bodies, noise when an impeller formed of the first and second blade bodies is run can be reduced to a minimum in contrast to the conventional case that an impression is left on the blade surface, thereby realizing a quiet run of the impeller.

BEST MODE FOR CARRYING OUT THE INVENTION

Below, a detailed description is made about an embodiment of the present invention with reference to the drawings.

Figure 1:
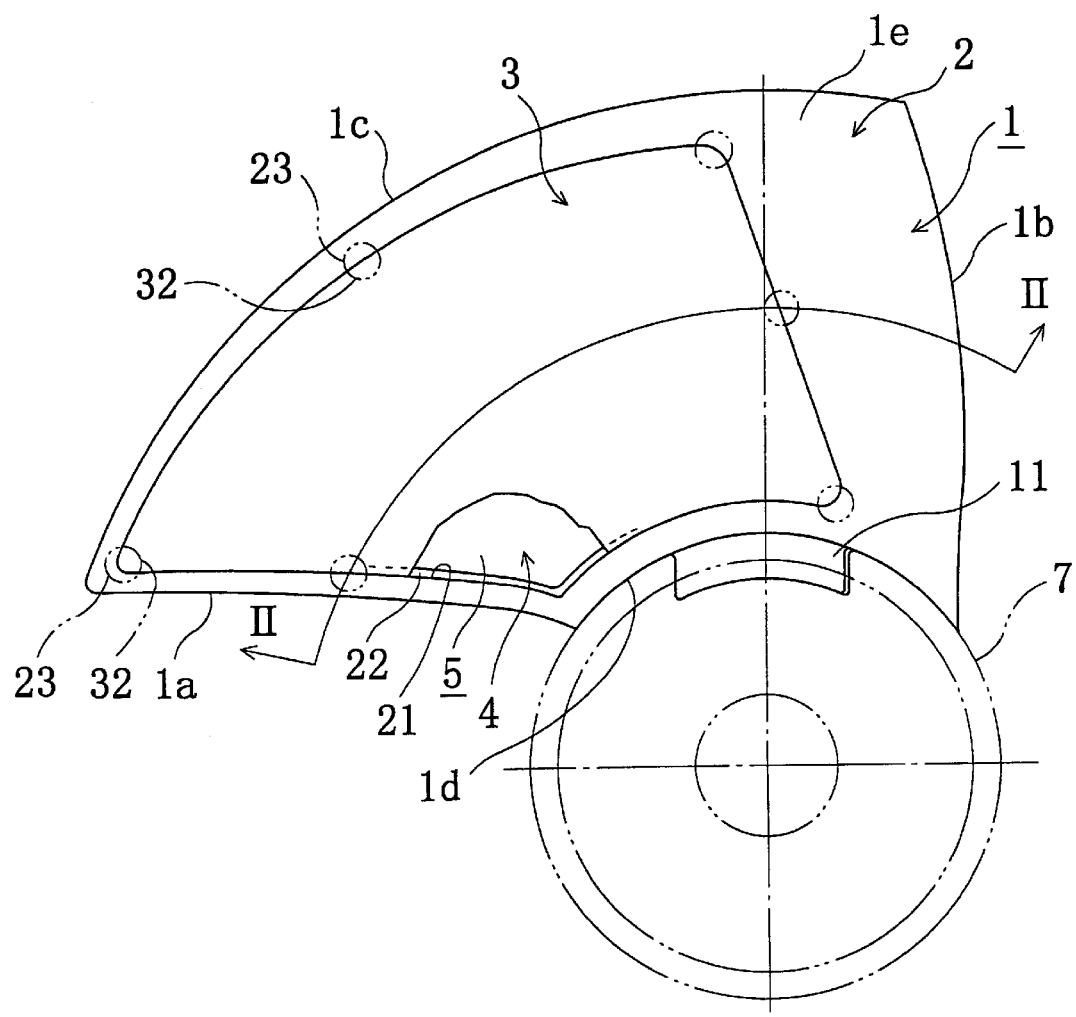
FIG. 1 is a plan view showing a hollow blade manufactured by a manufacturing method of this invention.
Figure 2:
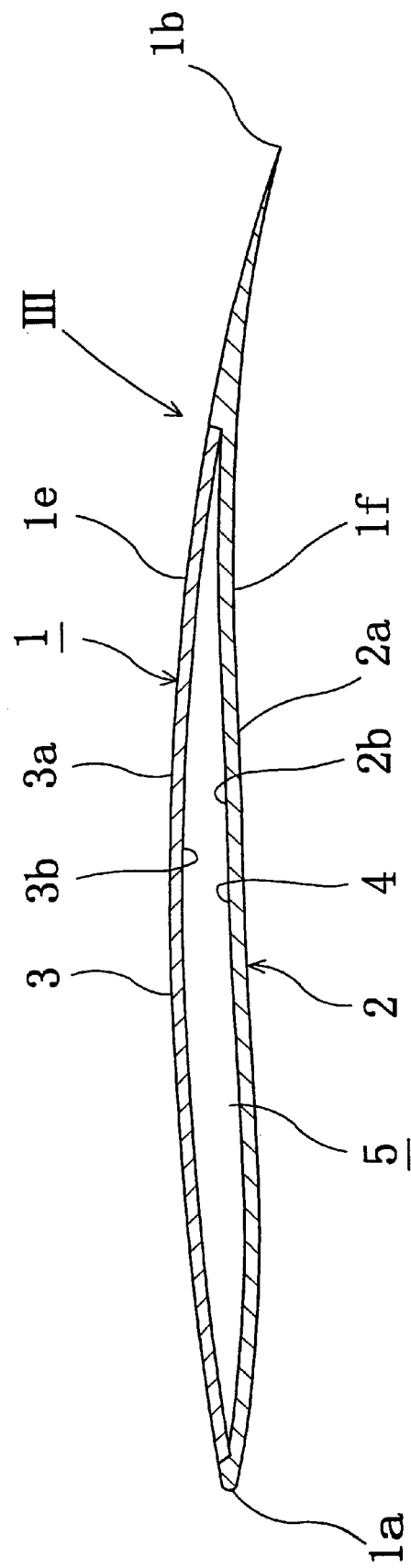
FIG. 2 is a cross-sectional view taken on line II—II FIG. 1.

FIG. 1 shows a hollow blade 1 manufactured by a manufacturing method of the present invention. FIG. 2 shows a sectional form of the hollow blade 1.

A plurality of such hollow blades 1 are fixed to a boss 7 thereby forming an impeller. As shown in FIGS. 1 and 2, the hollow blade 1 is formed into a plane having an approximate trapeziform outline and is internally provided with a hollow part 5 extending along the plane. The hollow blade 1 is manufactured by putting together first and second blade bodies 2, 3 and joining them.

The first blade body 2 is previously formed into a set shape by injection molding with the use of a resin material prior to a joint work below-mentioned. The shape is as follows: as shown in FIGS. 1 and 2, the first blade body 2 is formed into a plane having an approximate trapeziform outline; the surface 2a of the first blade body 2 forms the back face 1f of the hollow blade 1; and the back face 2b of the first blade body 2 is provided with an approximate trapeziform recessed part 4 which is recessed on the surface 2a side along the outline of the first blade body 2.

Figure 3:
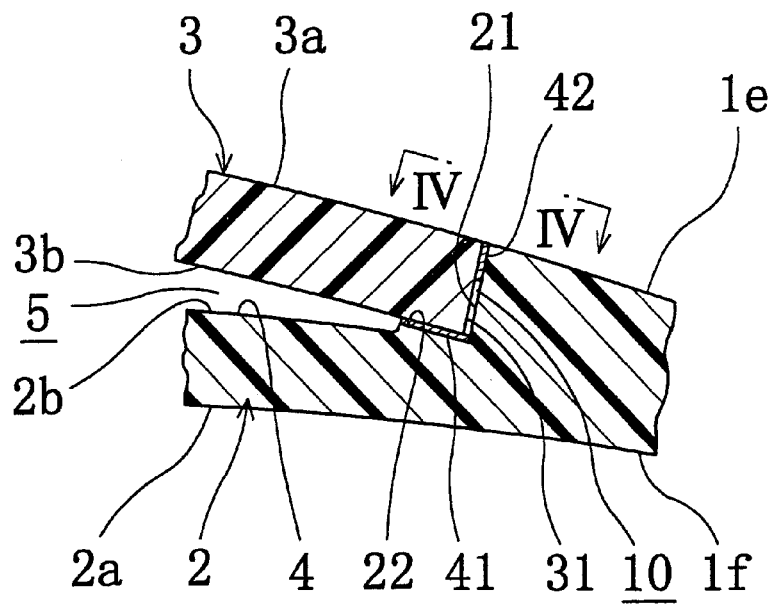
FIG. 3 is an enlarged view of a part III of FIG. 2.
Figure 5:
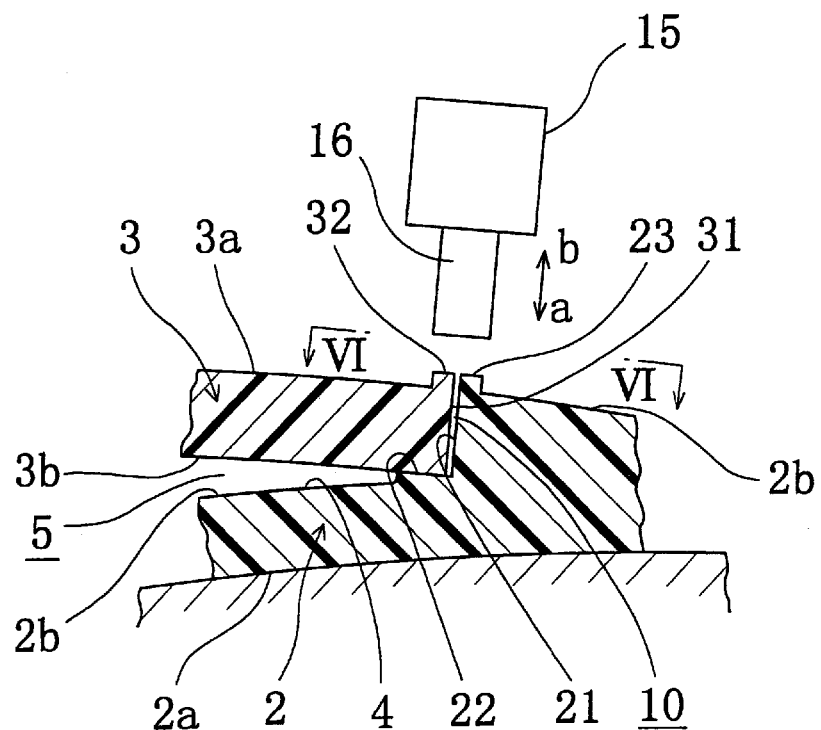
FIG. 5 is a cross-sectional view showing a process of manufacturing the hollow blade.

As shown in FIGS. 3 and 5, a peripheral edge of the recessed part 4 is provided with a shelf surface 22 which is located slightly above the bottom of the recessed part 4 and extends along the plane of the first blade body 2, and is provided with an outer peripheral end surface 21 rising along the outer peripheral edge of the shelf surface 22. The first blade body 2 has an integrally-molded blade fixing part 11 which serves as a part for fixing the first blade body 2 to the boss 7.

Similarly to the first blade body 2, the second blade body 3 is previously formed into a set shape by injection molding with the use of a resin material prior to the joint work. The shape is as follows: as shown in FIGS. 1 and 2, the second blade body 3 is fitted on the recessed part 4 of the first blade body 2 so as to cover it and is joined to the peripheral edge of the recessed part 4; the second blade body 3 is formed into a plane having an approximate trapeziform outline so as to conform to the outline of the recessed part 4; and the surface 3a of the second blade body 3 forms a part of the surface 1e of the hollow blade 1.

In a state that the second blade body 3 is fitted on the recessed part 4 of the first blade body 2 and the first and second blade bodies 2, 3 are put together (See FIGS. 1 and 2), the outer peripheral part of the back face 3b of the second blade body 3 comes into face-to-face contact with the shelf surface 22 provided on the recessed part 4 of the first blade body 2. Thus, the shelf surface 22 of the recessed part 4 of the first blade body 2 and the outer peripheral part of the back face 3b of the second blade body 3 form a contact surface and a contact part, respectively. Further, in the above state that both the blade bodies 2, 3 are put together, the outer peripheral end surface 21 of the recessed part 4 is opposed to an outer peripheral end surface 31 of the second blade body 3 with a set space left therebetween. Furthermore, between both the outer peripheral end surfaces 21 and 31, an annular clearance 10 is formed so as to extend along the outline of the recessed part 4.

Further, the first and second blade bodies 2, 3 are provided with convex parts 23, 32 characterized in the present invention, respectively.

Figure 6:
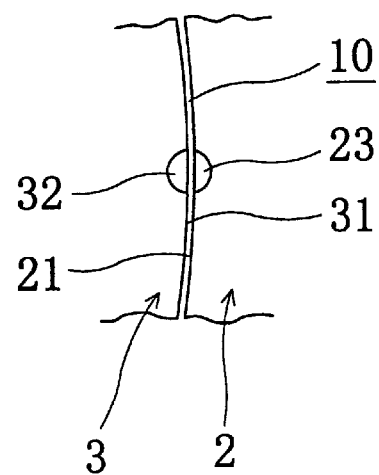
FIG. 6 is a view taken in the direction of arrows VI—VI of FIG. 5.
Figure 7:
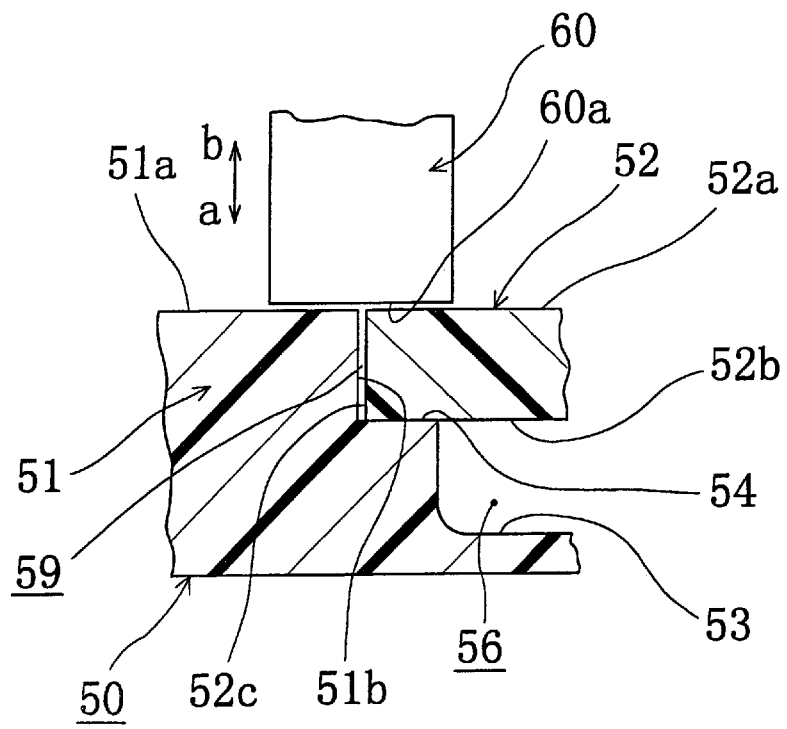
FIG. 7 is a cross-sectional view showing a conventional method of manufacturing a hollow blade.
Figure 8:
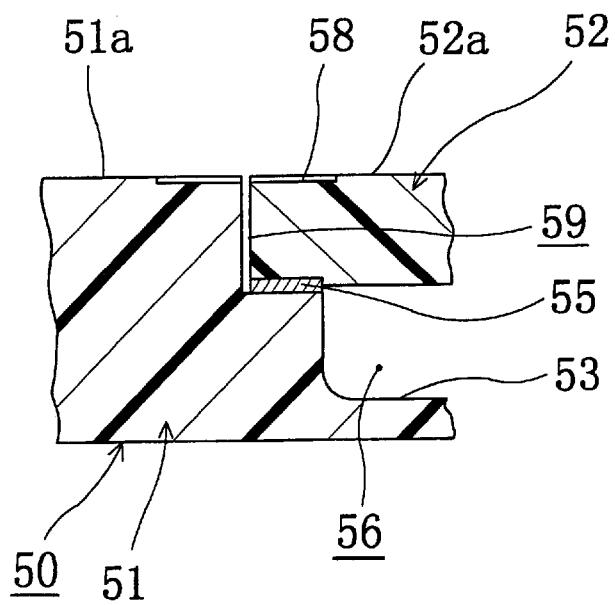
FIG. 8 is a cross-sectional view showing a hollow blade manufactured by the conventional manufacturing method.
Figure 9:
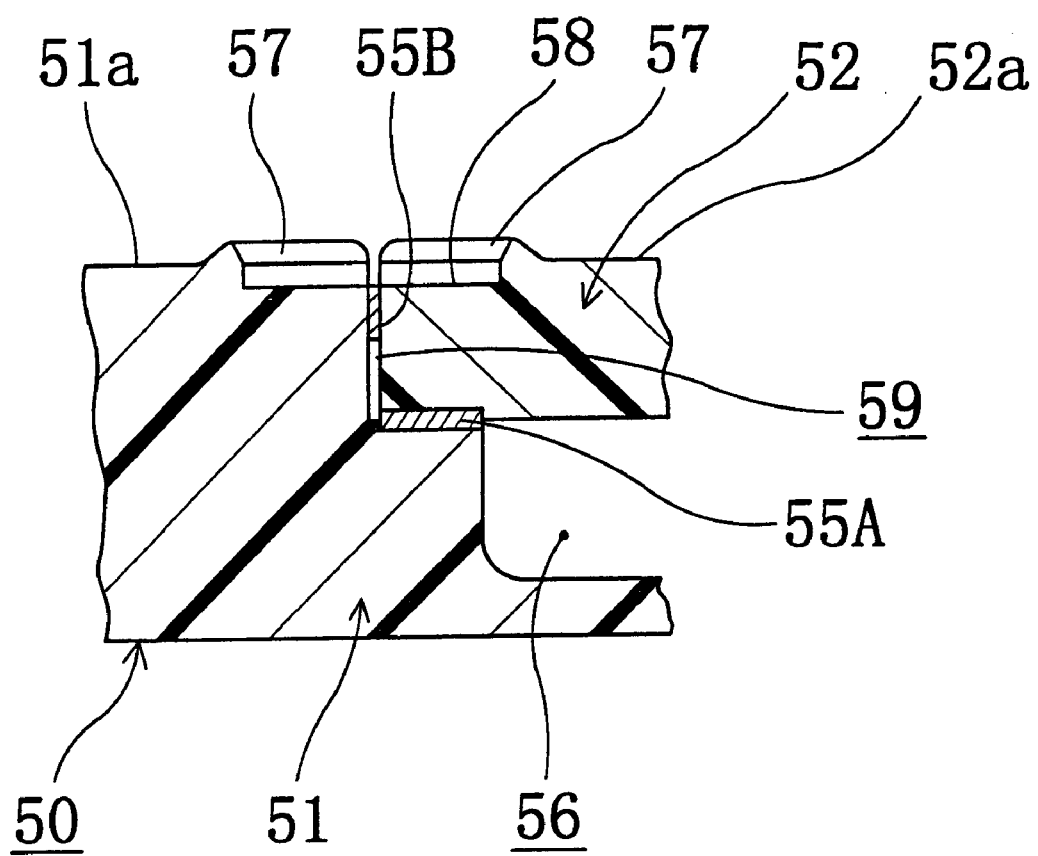
FIG. 9 is a cross-sectional view showing a hollow blade manufactured by the conventional manufacturing method.

As shown in FIGS. 5 and 6, the convex part 23 has an approximate half columnar shape and is formed on the back face 2b of the first blade body 2 which forms a part of the surface 1e of the hollow blade 1. A plurality of the convex parts 23 are provided along the peripheral edge of the recessed part 4. The convex parts 23 are integrally formed with the first blade body 2 in such a manner as to swell parts of the first blade body 2 to a set height when the first blade body 2 is injection-molded. In this embodiment, seven convex parts 23 are provided as shown in FIG. 1.

On the other hand, as shown in FIGS. 5 and 6, the convex part 32 has an approximate half columnar shape, similarly to the convex part 23, and is formed on the surface 3a of the second blade body 3 which forms a part of the surface 1e of the hollow blade 1. A plurality of the convex parts 32 are provided along the peripheral edge of the recessed part 4.

As shown in FIG. 1, the positions where the convex parts 32, 32, . . . of the second blade body 3 are to be formed are set to correspond to the positions of the convex parts 23, 23, . . . of the first blade body 2, respectively. The convex parts 32 are integrally formed with the second blade body 3 in such a manner as to swell parts of the second blade body 3 to a set height when the second blade body 3 is injection-molded.

Thus, as shown in FIG. 1, the convex parts 23, 23, . . . of the first blade body 2 are contiguous with and opposed to the convex parts 32, 32, . . . of the second blade body 3, respectively, when the first and second blade bodies 2, 3 are put together.

In the state that the convex parts 23 are opposed to the convex parts 32, respectively, the first and second blade bodies 2, 3 which are put together are subjected to a joint work by means of an ultrasonic welding device thereby forming both the blade bodies 2, 3 into one piece. This formation of a one-piece structure provides a hollow blade 1 internally provided with the hollow part 5 formed of the recessed part 4.

Joint Work

Next a description will be given to the joint work by means of the ultrasonic welding device.

As shown in FIG. 5, a horn 16 attached to an oscillator 15 of the ultrasonic welding device is placed above a pair of the convex parts 23, 32. The end of the horn 16 is made contact with the top surfaces of the convex parts 23, 32 and a specified pressing force is applied to the convex parts 23, 32. In this state, ultra sonic vibrations in a direction of applying the pressing force (direction of arrows a–b of FIG. 5) are given to the convex parts 23, 32 through the horn 16. Through the application of ultrasonic vibrations, frictional heat occurs at an interface between the shelf surface 22 of the first blade body 2 and the outer peripheral part of the back face 3*b* of the second blade 3 so that the interface is melted thereby forming a first resin melting part 41 as shown in FIG. 3. Through the first resin melting part 41, the first and second blade bodies 2, 3 are joined in the vicinity of a lower end of the clearance 10.

Figure 4:
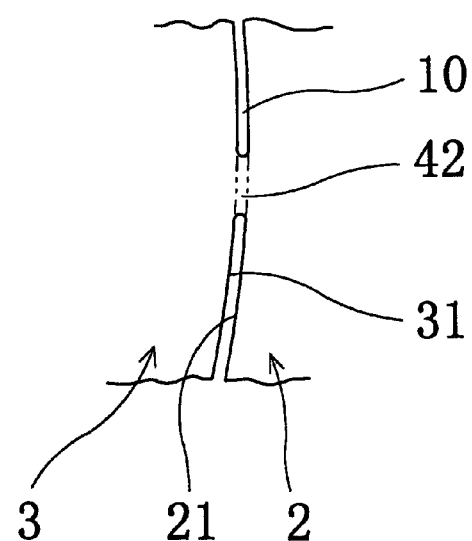
FIG. 4 is a view taken in the direction of arrows IV—IV of FIG. 3.

Meanwhile, frictional heat also occurs between each of the convex parts 23, 32 and the horn 16, so that the convex parts 23, 32 are melted. Melting resin thus obtained trickles into an upper part of the clearance 10 by the capillary action of the clearance 10 and the pressing action of the horn 16. Thus, as shown in FIGS. 3 and 4, a bridge-like second resin melting part 42 is formed at the upper part of the clearance 10 so as to cross the outer peripheral end surface 21 of the first blade body 2 and the outer peripheral end surface 31 of the second blade body 3. Through the second resin melting part 42, the first and second blade bodies 2, 3 are joined at the upper part of the clearance 10.

Effects

As mentioned so far, according to this embodiment, since the first and second blade bodies 2, 3 are joined to each other in the vicinity of the lower end of the clearance 10 as well as at the upper part of the clearance 10, joint strength can be increased as compared with the case that both the blade bodies 2, 3 are joined only in the vicinity of the lower end of the clearance 10. Further, when an impeller is produced with the use of such a hollow blade 1 formed of both the blade bodies 2 and 3, operational reliability can be ensured.

In the present embodiment, an amount of deformation of each of the convex parts 23, 32 through the application of pressure by the horn 16 is set at a value approximately identical to the height of the convex part 23, 32. Accordingly, as shown in FIG. 3, when the joint work is completed, no impression of the convex parts 23, 32 is left on the surface 1*e* of the hollow blade 1 and an approximate flush surface is formed from the back face 2*b* of the first blade body 2 to the surface 3*a* of the second blade body 3, thereby ensuring excellent smoothness. As a result, when an impeller is produced with the use of the hollow blade 1, noise production during the running of the impeller can be reduced as compared with the conventional case that an impression due to the joint work is left on the blade surface, thereby realizing a quiet run of the impeller.

Further, the hollow blade 1 manufactured according to the present embodiment is subjected to a post-manufacturing quality inspection in which the joint state of the first and second blade bodies 2, 3 is verified. In the hollow blade 1 of the present embodiment, the convex parts 23, 32 having been formed on the first and second blade bodies 2, 3 prior to the joint work are eliminated by deformation under pressure during the joint work. Accordingly, in the quality inspection, an inspector can check the state of the first resin melting part 41 inside the hollow blade 1 with ease and reliability through a visual check for the convex parts 23, 32 from outside. Thus, the joint state can be verified with ease and reliability thereby ensuring efficiency and reliability of the quality inspection.

INDUSTRIAL APPLICABILITY

As described so far, according to a method of manufacturing a hollow blade of the invention and a hollow blade manufactured by the method, the joint state can be readily verified and high joint strength can be obtained. Such a hollow blade is suitable for use in a low-noise impeller.

What is claimed is:

1. A method of manufacturing a hollow blade whereby first and second resin-made blade bodies formed by injection molding are put together and are joined by welding by means of an ultrasonic welding device to form a hollow blade internally provided with a hollow part, comprising the steps of:

injection-molding the first and second blade bodies, forming respective convex parts swelling from respective surfaces of the first and second blade bodies at positions contiguous with and opposed to each other when both the blade bodies are put together;

placing a horn of the ultrasonic welding device at a position that the horn crosses both the convex parts to come into contact with the top surfaces of the convex parts while pressing them at the same time and then, in this state, operating the ultrasonic welding device; and welding contact surfaces of the first and second blade bodies which extend in a direction approximately orthogonal to a direction of putting together both the blade bodies at their portions corresponding to a pressing direction of the horn, and concurrently deforming both the convex parts by melting under pressure through the horn to trickle melting resin of both the convex parts into a clearance between the first and second blade bodies so that both the blade bodies are welded, thereby joining both the blade bodies into one piece to form a hollow blade.

2. A method of manufacturing a hollow blade according to claim 1, wherein an amount of deformation of each of the convex parts through the application of pressure by the horn is set at a value approximately identical to the height of the convex part.

3. A hollow blade in which first and second blade bodies made of resin are put together to form a hollow part therebetween, wherein the first and second blade bodies made of resin in a state of being put together are joined by welding at their contact parts and their opposed parts forming a clearance created when the first and second blade bodies are put together, and a welded part at the clearance between the first and second blade bodies is formed such that the surface of the welded part is approximately coplanar with a surface of the hollow blade comprising the surfaces of the first and second blade bodies.

\* \* \* \* \*